(12) United States Patent
Takagi et al.

(10) Patent No.: US 9,869,812 B2
(45) Date of Patent: Jan. 16, 2018

(54) LIGHT GUIDE BODY, LIGHT EMITTING APPARATUS, AND AMUSEMENT MACHINE

(71) Applicant: OMRON Corporation, Kyoto-shi, Kyoto (JP)

(72) Inventors: Yoshihiko Takagi, Kyoto (JP); Yoshimasa Osumi, Kyoto (JP); Norikazu Kitamura, Osaka (JP); Masayuki Shinohara, Kyoto (JP)

(73) Assignee: OMRON Corporation, Kyoto (JP)

( * ) Notice: Subject to any disclaimer, the term of this patent is extended or adjusted under 35 U.S.C. 154(b) by 356 days.

(21) Appl. No.: 14/553,836

(22) Filed: Nov. 25, 2014

(65) Prior Publication Data

US 2015/0185396 A1 Jul. 2, 2015

(30) Foreign Application Priority Data

Dec. 27, 2013 (JP) .................................. 2013-272452

(51) Int. Cl.
*F21V 8/00* (2006.01)

(52) U.S. Cl.
CPC ......... *G02B 6/0068* (2013.01); *G02B 6/0036* (2013.01); *G02B 6/0061* (2013.01)

(58) Field of Classification Search
CPC ... G02B 6/0068; G02B 6/0036; G02B 6/0061
See application file for complete search history.

(56) References Cited

U.S. PATENT DOCUMENTS

| 2008/0316744 A1* | 12/2008 | Hirota | G02B 5/021 362/247 |
| 2010/0027293 A1* | 2/2010 | Li | G02B 6/002 362/619 |
| 2012/0087147 A1* | 4/2012 | Hudson | F21V 11/00 362/605 |

FOREIGN PATENT DOCUMENTS

| JP | H11-85075 A | 3/1999 |
| JP | 2013-080120 A | 5/2013 |

OTHER PUBLICATIONS

Notification of Reasons for Refusal issued in corresponding Japanese Application No. 2013-272452, dated Aug. 1, 2017 (7 pages).

* cited by examiner

*Primary Examiner* — Sharon Payne
(74) *Attorney, Agent, or Firm* — Osha Liang LLP

(57) ABSTRACT

A light guide body configured to guide at least first and second light having different colors that enter the light guide body from at least one light source has a light exit surface having a light emitting region that emits the first light and the second light from the at least one light source, and a reflection region that reflects, toward the light emitting region, the first light and the second light that enters the light guide body. The reflection region has a first pattern region where a plurality of first reflection patterns that reflects the first light are arranged, and a second pattern region where a plurality of second reflection patterns that reflects the second light are arranged. When viewed from a direction perpendicular to the light exit surface, the first pattern region and the second pattern region at least partially overlapping with each other.

11 Claims, 10 Drawing Sheets

FIG. 3
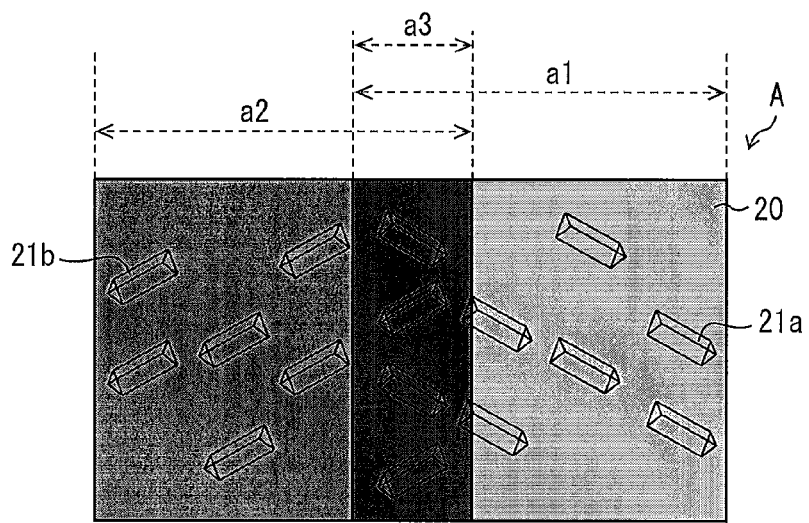
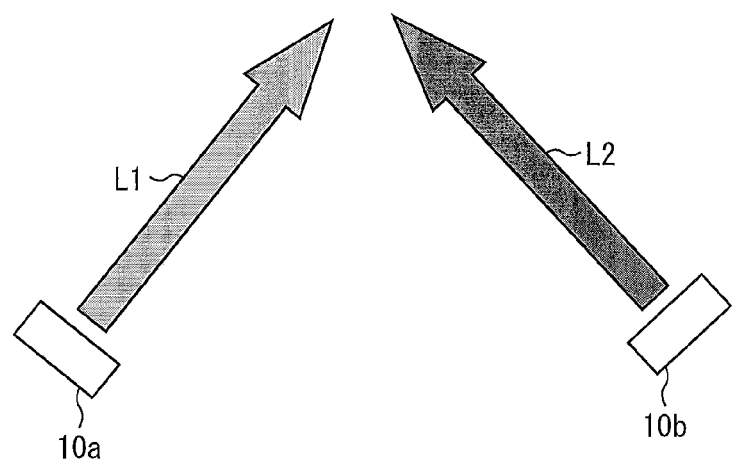

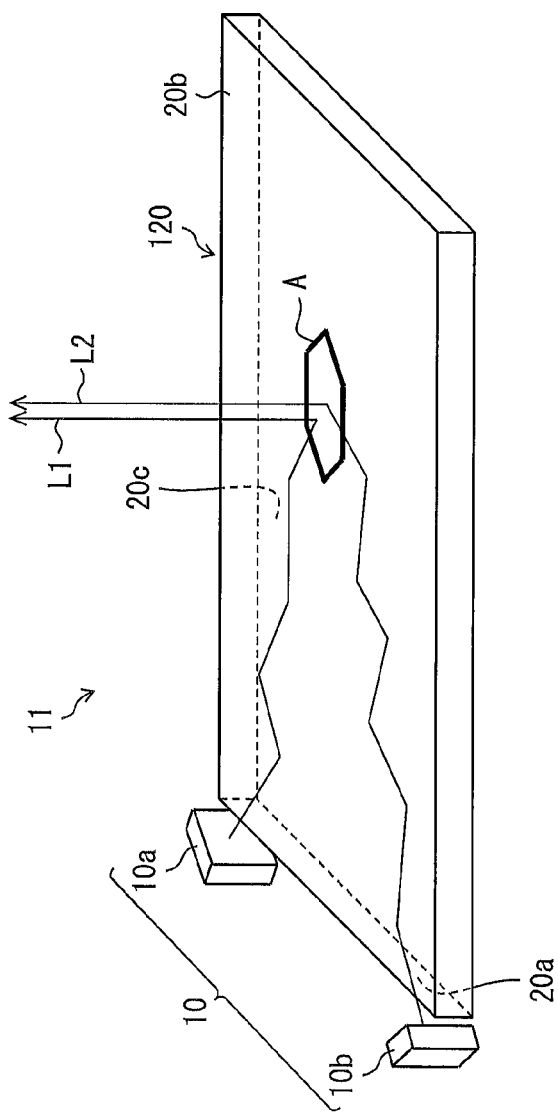
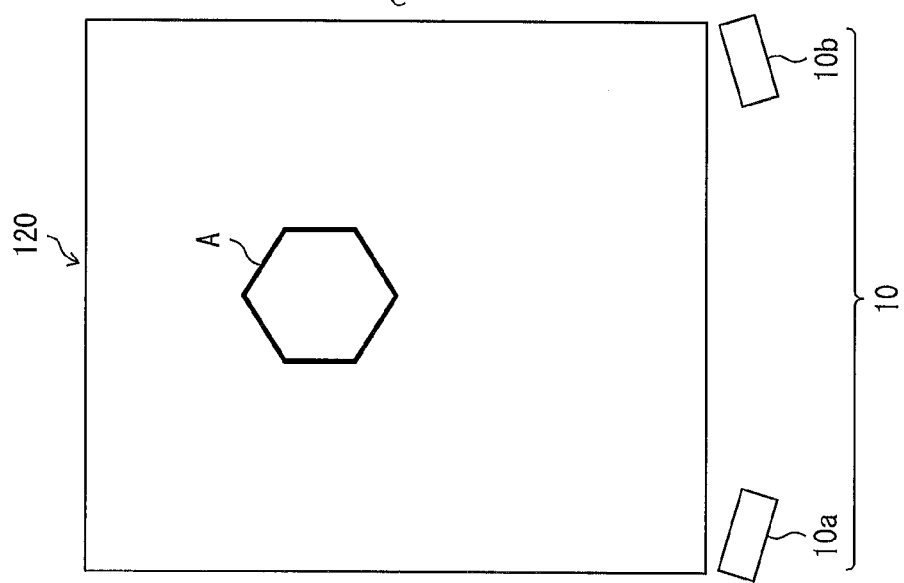
FIG. 9 (a)
FIG. 9 (b)

LIGHT GUIDE BODY, LIGHT EMITTING APPARATUS, AND AMUSEMENT MACHINE

CROSS-REFERENCE TO RELATED APPLICATIONS

This Nonprovisional application claims priority under 35 U.S.C. §119 to Japanese Patent Application No. 2013-272452 filed in Japan on Dec. 27, 2013, the entire contents of which are hereby incorporated by reference.

BACKGROUND

Technical Field

The present invention relates to (i) a light guide body which guides light having entered the light guide body from a light source and causes the light to exit through a light exit surface of the light guide body, (ii) a light emitting apparatus including the light guide body, and (iii) an amusement machine.

Related Art

Conventionally, there is known a technique in which light emitted from a light source enters a light guide plate through a side surface of the light guide plate and the light is reflected by a reflection pattern, provided on a back surface of the light guide plate, so as to exit through a front surface of the light guide plate.

For example, Patent Literature 1 discloses a technique in which a reflection pattern is provided in a region, having a shape corresponding to a predetermined text, of a back surface of a light guide plate, so that a region of a front surface of the light guide plate which region corresponds to the text emits light having a mixed color.

CITATION LIST

Patent Literature

Patent Literature 1
Japanese Patent Application Publication, Tokukaihei, No. 11-85075 (Publication Date: Mar. 30, 1999)

SUMMARY

However, although the technique disclosed in Patent Literature 1 makes it possible to cause the text corresponding to the shape of the reflection pattern to emit the light having the mixed color, it is necessary for the technique to separately provide a mixed-color member (diffusion sheet) which allows the light having the mixed color to enter the light guide plate.

One or more embodiments of the present invention provides a light guide body capable of, without using a mixed-color member, causing a light emitting region defined in a light exit surface to emit light having a mixed color, the light guide body guiding light which has entered the light guide body from a light source and causing the light to exit from the light emitting region, a light emitting apparatus, and an amusement machine.

A light guide body according to one or more embodiments of the present invention (i) guides light having entered the light guide body from a light source and (ii) causes the light to exit from a light emitting region defined in a light exit surface of the light guide body, the light guide body receiving at least first light and second light which are different in color from each other, the light guide body having a reflection region which reflects, toward the light emitting region, the first light and the second light which have entered the light guide body, the reflection region including (i) a first pattern region where a plurality of first reflection patterns which reflect the first light are arranged and (ii) a second pattern region where a plurality of second reflection patterns which reflect the second light are arranged, and when viewed from a direction perpendicular to the light exit surface, the first pattern region and the second pattern region at least partially overlapping with each other.

According to one or more embodiments of the present invention, it is possible to provide a light guide body capable of, without using a mixed-color member, causing a light emitting region defined in a light exit surface to emit light having a mixed color, the light guide body guiding light which has entered the light guide body from a light source and causing the light to exit from the light emitting region, (ii) a light emitting apparatus, and (iii) an amusement machine.

BRIEF DESCRIPTION OF DRAWINGS

FIG. 1(a) is a top view of the light emitting apparatus, and FIG. 1(b) is a perspective view of the light emitting apparatus.

FIG. 3 is a top view illustrating an enlarged part of a light emitting region illustrated in FIGS. 1(a)-1(b).

FIGS. 9(a)-9(b) are explanatory drawings schematically illustrating a configuration of a light emitting apparatus including a light guide plate of Embodiment 2. FIG. 9(a) is a top view of the light emitting apparatus, and FIG. 9(b) is a perspective view of the light emitting apparatus.

DETAILED DESCRIPTION

Figure 1:
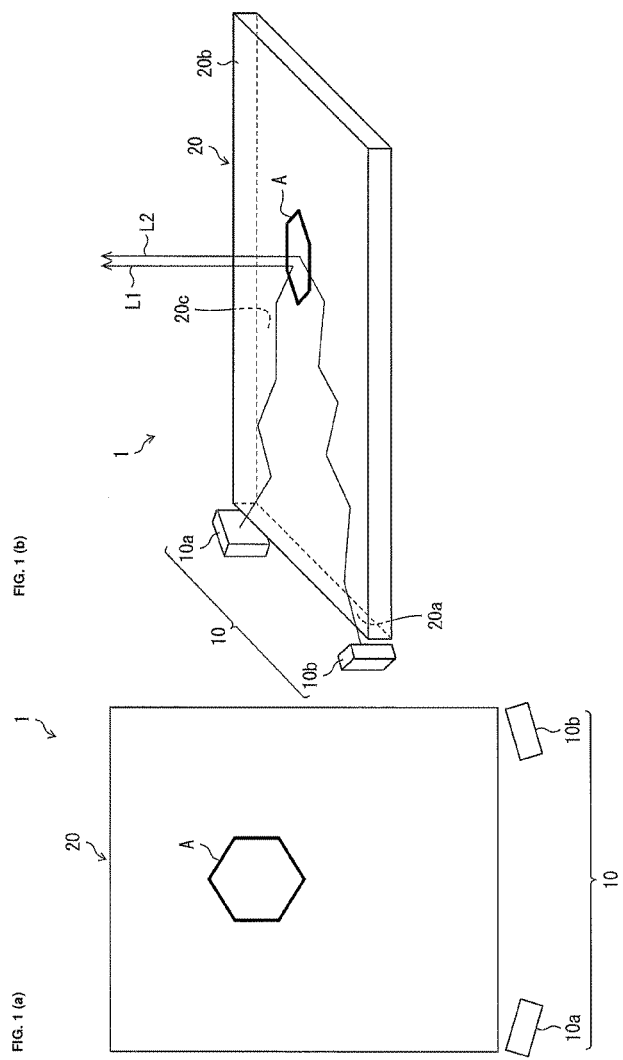
FIGS. 1(a)-1(b) are explanatory drawings schematically illustrating a configuration of a light emitting apparatus including a light guide plate of Embodiment 1.

Embodiments of the present invention will be discussed below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the present invention is described below with reference to FIGS. 1(a) through 8, wherein an example of a light emitting apparatus including a light guide body is provided.

<Configuration of Light Emitting Apparatus 1>

FIGS. 1(a)-1(b) are explanatory drawings schematically illustrating a configuration of a light emitting apparatus 1 including a light guide plate (light guide body) 20 according to one or more embodiments of the present invention. FIG. 1(a) is a top view of the light emitting apparatus 1, and FIG. 1(b) is a perspective view of the light emitting apparatus 1. The light emitting apparatus 1 is suitably provided in an amusement machine such as a pachinko machine or a slot machine, and brings about various visual effects by causing an object such as a diagram, a text, or a picture pattern to be displayed on a front surface 20b of the light guide plate 20.

The light emitting apparatus 1 includes a light source 10 and the light guide plate 20 (see FIGS. 1(a)-1(b)).

(Light Source 10)

The light source 10 is a light emitting element which emits light toward a side surface (light entering surface) 20a of the light guide plate 20. The light source 10 is provided so as to face the side surface 20a of the light guide plate 20. Light emitted from the light source 10 enters the light guide plate 20 through the side surface 20a.

According to Embodiment 1, a light source (first light source) 10a and a light source (second light source) 10b are provided as the light source 10 so as to face the side surface 20a of the light guide plate 20. The light sources 10a and 10b emit respective beams of light which differ in color. Specifically, the light source 10a emits light (first light) L1, and the light source 10b emits light (second light) L2 whose color is different from that of the light L1. The light sources 10a and 10b are provided so that an angle at which the light L1 enters the side surface 20a of the light guide plate 20 differs from an angle at which the light L2 enters the side surface 20a of the light guide plate 20.

The light sources 10a and 10b are not particularly limited in kind. For example, a light source having a directivity such as an LED (Light Emitting Diode) is suitably usable.

Note that a combination of (i) a color of the light L1 emitted by the light source 10a and (ii) a color of the light L2 emitted by the light source 10b is not particularly limited. The combination is selected as appropriate according to, for example, a color of light to be emitted by a light emitting region A (later described).

The number of light sources 10a to be provided and the number of light sources 10b to be provided are neither particularly limited. For example, a plurality of light sources 10a and a plurality of light sources 10b may be provided so as to face the side surface 20a of the light guide plate 20. A light source which emits light whose color is different from those of beams of light emitted by the light sources 10a and 10b may further be provided for the light guide plate 20.

(Light Guide Plate 20)

The light guide plate 20 is a light guide member which (i) guides light L1 and light L2 having entered the light guide plate 20 from the respective light sources 10a and 10b and (ii) causes the light L1 and the light L2 to exit through the front surface (light exit surface) 20b. The light guide plate 20 is a plate-like transparent member made of a material which totally reflects light (e.g., an acrylic resin).

The light L1 and the light L2 which have entered the light guide plate 20 through the side surface 20a of the light guide plate 20 propagate in the light guide plate 20 while being totally reflected by the front surface 20b and a back surface 20c of the light guide plate 20. The light L1 and the light L2 exit from the light emitting region A defined in the front surface 20b of the light guide plate 20.

Note that a shape of the light guide plate 20 is not limited to a shape having a flat surface. The shape of the light guide plate 20 may be a shape having a spherical surface or a free-form curve surface. According to Embodiment 1, the light guide plate 20, which has a plate-like shape, is employed as the light guide body. Alternatively, the light guide plate 20 may have a shape other than the plate-like shape such as a cylindrical shape.

Figure 2:
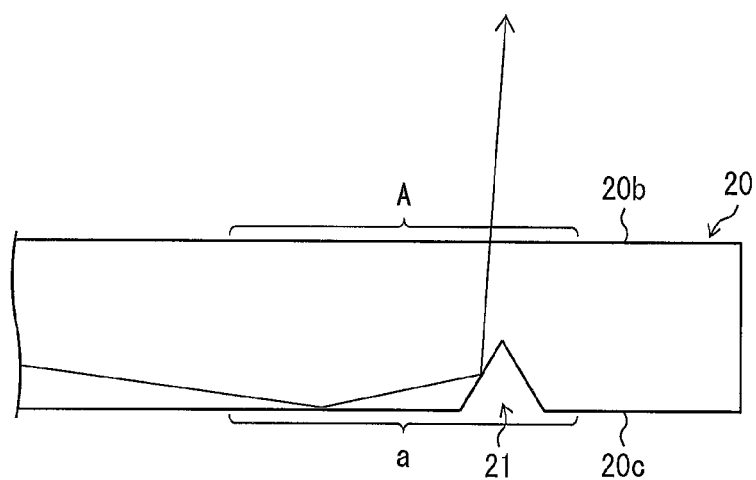
FIG. 2 is a cross-sectional view illustrating a reflection pattern formed in the light guide plate illustrated in FIGS. 1(a)-1(b).

FIG. 2 is a cross-sectional view illustrating a reflection pattern 21 formed in the light guide plate 20. As illustrated in FIG. 2, a plurality of reflection patterns 21 for regularly reflecting, toward the light emitting region A, light which has entered the light guide plate 20 from the light source 10 and propagated in the light guide plate 20 are formed in a region (hereinafter referred to as a reflection region) a of the back surface 20c of the light guide plate 20, the region a corresponding to the light emitting region A (FIG. 2 illustrates only one reflection pattern 21). The reflection pattern 21 has a reflection surface which is inclined to reflect, toward the light emitting region A, the light having entered the light guide plate 20 through the side surface 20a of the light guide plate 20 from the light source 10.

According to Embodiment 1, the reflection pattern 21 is a groove which (i) has a substantially isosceles triangular-shaped (V-shaped) cross section which is perpendicular to the back surface 20c of the light guide plate 20 and is parallel to a direction in which light is guided and (ii) is formed by notching the back surface 20c of the light guide plate 20 so that the groove linearly extends in a direction perpendicular to the cross section. Note that the light guide plate 20 is a so-called see-through light guide panel made of a transparent material (described earlier). Therefore, in a case where the light source 10 is in an OFF state, the reflection pattern 21 is not recognized by an observer who observes the front surface 20b.

Note, however, that the reflection pattern 21 is not limited to a groove-shaped pattern formed by notching the back surface 20c of the light guide plate 20. The reflection pattern 21 may be formed so as to protrude outside from the back surface 20c of the light guide plate 20. The reflection pattern 21 does not need to be integrated with the light guide plate 20. For example, the reflection pattern 21 may be configured to be attached to the back surface 20c of the light guide plate 20.

Figure 4:
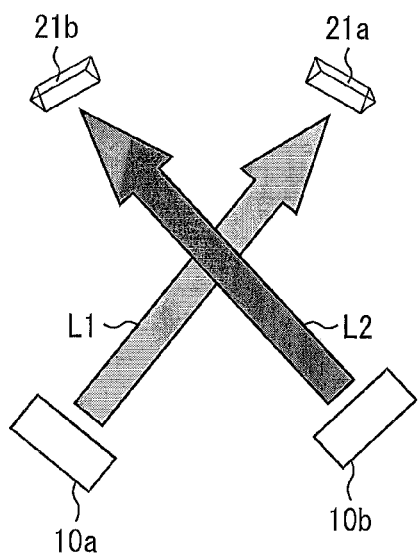
FIG. 4 is a schematic view for explaining facing directions of respective reflection patterns illustrated in FIG. 3.

FIG. 3 is a top view illustrating an enlarged part of the light emitting region A illustrated in FIGS. 1(a)-1(b). FIG. 4 is a schematic view for explaining a facing direction of a reflection pattern 21a illustrated in FIG. 3 and a facing direction of a reflection pattern 21b illustrated in FIG. 3.

As illustrated in FIG. 3, the reflection region a which corresponds to the light emitting region A includes at least a first pattern region a1 and a second pattern region a2.

The first pattern region a1 is a region in which light L1 from the light source 10a is reflected toward the light emitting region A. In the first pattern region a1 arranged are a plurality of reflection patterns (first reflection patterns) 21a each having a reflection surface whose facing direction and angle of inclination are adjusted so that the reflection surface reflects, toward the light emitting region A, the light L1 from the light source 10a.

The second pattern region a2 is a region in which light L2 from the light source 10b is reflected toward the light emitting region A. In the second pattern region a2 arranged are a plurality of reflection patterns (second reflection patterns) 21b each having a reflection surface whose facing direction and angle of inclination are adjusted so that the reflection surface reflects, toward the light emitting region A, the light L2 from the light source 10b.

As illustrated in FIG. 4, the plurality of reflection patterns 21a arranged in the first pattern region a1 are arranged (aligned) at a constant density so that (i) their reflection surfaces are substantially parallel to each other and (ii) a direction in which the plurality of reflection patterns 21a extend is perpendicular to an optical axis direction of the light L1 entering the light guide plate 20 from the light source 10a. This arrangement allows the plurality of reflection patterns 21a to suitably reflect the light L1 from the light source 10a in a predetermined direction.

Further, the plurality of reflection patterns 21b arranged in the second pattern region a2 are arranged (aligned) at a constant density so that (i) their reflection surfaces are substantially parallel to each other and (ii) a direction in which the plurality of reflection patterns 21b extend is perpendicular to an optical axis direction of the light L2 entering the light guide plate 20 from the light source 10b. This arrangement allows the plurality of reflection patterns 21b to suitably reflect the light L2 from the light source 10b in a predetermined direction.

According to Embodiment 1, the facing directions of and the angles of inclination of the reflection surfaces of the reflection patterns 21a and 21b are adjusted so that the light L1 and the light L2 exit from the light emitting region A in a same direction (e.g., a direction perpendicular to the front surface 20b). This allows an observer in front of the front surface 20b (light emitting region A) to visually recognize the light L1 and the light L2 in a suitable manner.

Note here that, when viewed from the direction perpendicular to the front surface 20b, (i) the first pattern region a1 where the plurality of reflection patterns 21a which reflect light L1 are arranged and (ii) the second pattern region a2 where the plurality of reflection patterns 21b which reflect light L2 are arranged partially overlap with each other.

In a region (hereinafter referred to as a mixed-color region a3) where the first pattern region a1 and the second pattern region a2 overlap with each other, the light L1 and the light L2 are reflected toward the light emitting region A. This allows part of the light emitting region A which part corresponds to the mixed-color region a3 to emit light having a mixed color of the color of the light L1 and the color of the light L2. More specifically, (i) the light L1 is emitted from part of the light emitting region A which part corresponds only to the first pattern region a1, (ii) the light having the mixed color of the color of the light L1 and the color of the light L2 is emitted from the part of the light emitting region A which part corresponds to the mixed-color region a3, and (iii) the light L2 is emitted from part of the light emitting region A which part corresponds only to the second pattern region a2.

As such, the light emitting region A can emit light having a plurality of colors including the mixed color of the color of the light L1 and the color of the light L2.

<How Light Exits from Light Guide Plate 20>

Figure 5:
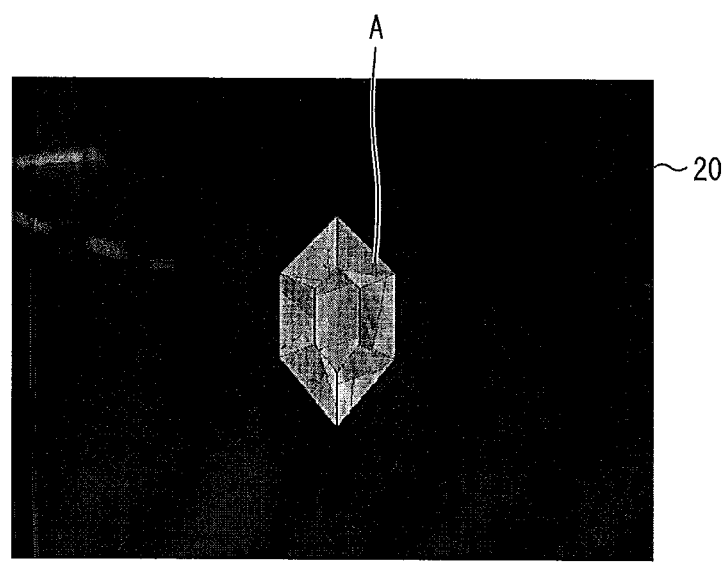
FIG. 5 is a photograph showing an example of a light emitting state of the light guide plate of Embodiment 1.
Figure 6:
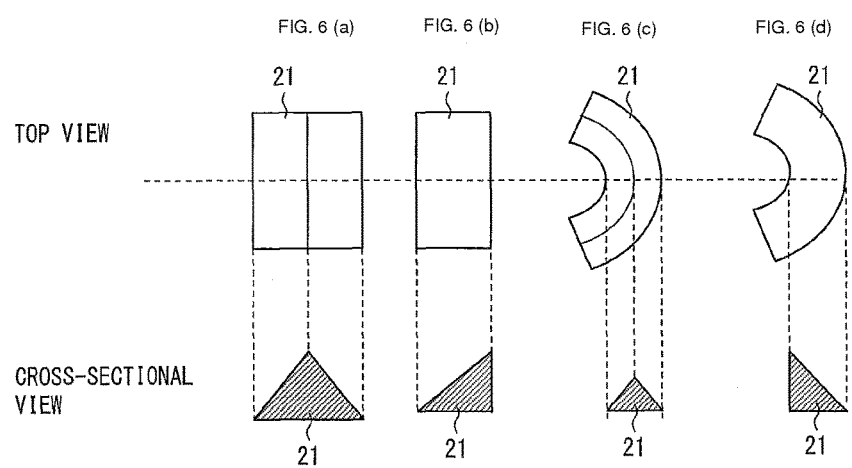
FIGS. 6(a)-6(d) are cross-sectional views each showing a modified example of the reflection pattern.

FIG. 5 is a photograph showing an example of a light emitting state of the light guide plate 20 of Embodiment 1. The example showed in FIG. 5 shows how light exits from the light guide plate 20 in a case where the reflection region a is made up of a combination of plural pairs (seven pairs in Embodiment 1) in each of which pairs two pattern regions, such as the first pattern region a1 and the second pattern region a2 illustrated in FIG. 3, partially overlap with each other. That is, the seven pairs correspond to respective seven faces which constitute a diagram (the light emitting region A) displayed on the light guide plate 20.

In a case of the example illustrated in FIG. 5, each of the seven faces which constitute the light emitting region A emits light thanks to a corresponding pair of pattern regions of the seven pairs formed in the reflection region a. Therefore, each of the seven faces which constitute the light emitting region A can emit the light having the plurality of colors including the mixed color of the color of the light L1 and the color of the light L2. It is therefore possible to improve a visual effect to an observer.

<Effect of Light Emitting Apparatus 1>

As such, the light emitting apparatus 1 of Embodiment 1 includes the light guide plate 20 which (i) guides light L1 and light L2 which have entered the light guide plate 20 from the respective light sources 10a and 10b and (ii) causes the light L1 and the light L2 to exit from the light emitting region A defined in the front surface 20b. The light guide plate 20 has the reflection region a which reflects, toward the light emitting region A, at least the light L1 and the light L2, different in color, which have entered the light guide plate 20. The reflection region a includes (i) the first pattern region a1 where the plurality of reflection patterns 21a which reflect the light L1 are arranged and (ii) the second pattern region a2 where the plurality of reflection patterns 21b which reflect the light L2 are arranged. The first pattern region a1 and the second pattern region a2 at least partially overlap with each other when viewed from the direction perpendicular to the front surface 20b.

As described above, the light emitting apparatus 1 is configured so that, when viewed from the direction perpendicular to the front surface 20b of the light guide plate 20, (i) the first pattern region a1 where the plurality of reflection patterns 21a which reflect the light L1 are arranged and (ii) the second pattern region a2 where the plurality of reflection patterns 21b which reflect the light L2 different in color from the light L1 are arranged at least partially overlap with each other.

With this configuration, in the mixed-color region a3 where the first pattern region a1 and the second pattern region a2 overlap with each other, the light L1 and the light L2 are reflected toward the light emitting region A. This allows the part of the light emitting region A which part corresponds to the mixed-color region a3 to emit the light having the mixed color of the color of the light L1 and the color of the light L2.

Therefore, according to Embodiment 1, it is possible to realize a light emitting apparatus 1 capable of, without using a mixed-color member, emitting light having a mixed color from a light emitting region A.

MODIFIED EXAMPLES

Modified Example 1

FIGS. 6(a)-6(d) are cross-sectional views each showing a modified example of the reflection pattern 21. An upper part of each of FIGS. 6(a)-6(d) is a top view of the reflection pattern 21, and a lower part of each of FIGS. 6(a)-(d) is a cross-sectional view of the reflection pattern 21.

According to Embodiment 1 described earlier, as illustrated in FIG. 6(a), the reflection pattern 21 has a cross section that has a substantially isosceles triangular shape having two inclined surfaces. Note, however, that a cross-sectional shape of and a pattern shape of the reflection pattern 21 can be appropriately changed in accordance with, for example, position(s) at which the light source(s) 10 is/are provided, the number of the light source(s) 10, kinds of object to be displayed, and/or a direction in which light is reflected.

For example, as illustrated in FIG. 6(b), it is possible to form, as the reflection pattern 21, a groove which has a cross section that has a substantially right triangular shape having one inclined surface. In a case where the groove is formed as the reflection pattern 21, the reflection pattern 21 is formed so that the inclined surface faces a direction in which light enters the light guide plate 20.

Alternatively, as illustrated in FIG. 6(c) and FIG. 6(d), the reflection pattern 21 may have a curved pattern shape instead of a linear pattern shape.

Modified Example 2

Figure 7:
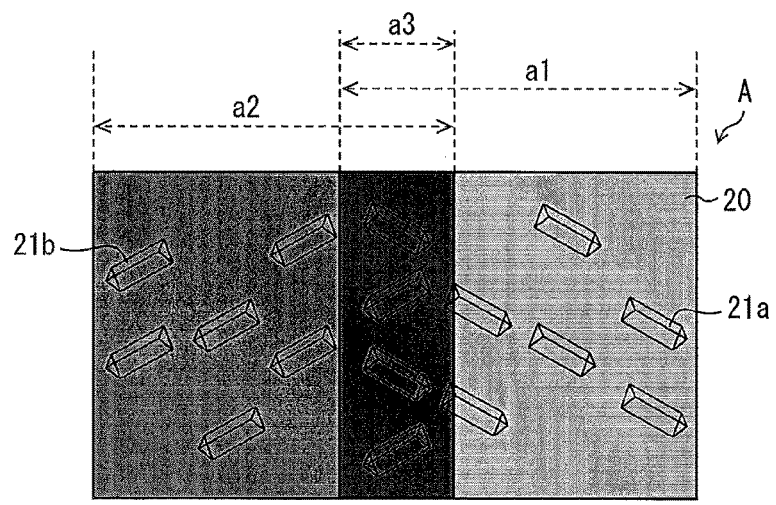
FIG. 7 is a top view for explaining a modified example of the light emitting region illustrated in FIG. 3.
Figure 8:
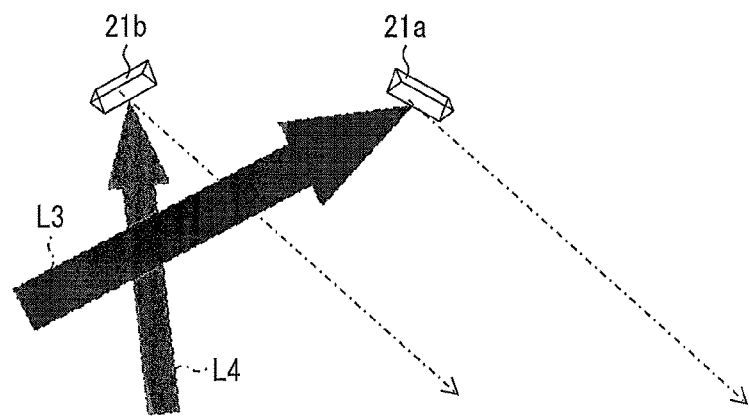
FIG. 8 is a schematic view for explaining reflection directions in which beams of light are reflected by respective reflection patterns illustrated in FIG. 7.

FIG. 7 is a top view for explaining a modified example of the light emitting region A illustrated in FIG. 3. FIG. 8 is a schematic view for explaining (i) a reflection direction in which light L3 is reflected by the reflection pattern 21a illustrated in FIG. 7 and (ii) a reflection direction in which light L4 is reflected by the reflection pattern 21b illustrated in FIG. 7.

As illustrated in FIGS. 7 and 8, for example, the reflection pattern 21a may further reflect, toward a direction different from a direction in which light L1 is reflected, light (third light) L3 which has entered the light guide plate 20 from a light source (third light source) in a direction different from a direction in which the light L1 enters the light guide plate 20. Furthermore, the reflection pattern 21b may further reflect, toward a direction which is different from a direction in which light L2 is reflected but is the same as the direction in which the light L3 is reflected, light (fourth light) L4 which has entered the light guide plate 20 from a light source (fourth light source) in a direction different from a direction in which the light L2 enters the light guide plate 20.

In this case, the light L3 and the light L4 are emitted from the light emitting region A toward a direction (e.g., a direction oblique to the front surface 20b) different from the direction in which the light L1 and the light L2 are emitted (e.g., the direction perpendicular to the front surface 20b). Therefore, in a case where an observer observes the light emitting region A from the direction in which the light L1 and the light L2 are emitted, the observer can visually recognize the light emitting region A emitting the light having the plurality of colors including the mixed color of the color of the light L1 and the color of the light L2. In a case where an observer observes the light emitting region A from the direction in which the light L3 and the light L4 are emitted, the observer can visually recognize the light emitting region A emitting light having a plurality of colors including a mixed color of a color of the light L3 and a color of the light L4.

As such, according to Modified Example 2, it is possible to change, in accordance with an observation location of an observer, a color of the light emitting region A which is visually recognized by the observer.

Embodiment 2 of the present invention is described below with reference to FIGS. 9(a) through 11. Note that for convenience, members having functions identical to those of the respective members of Embodiment 1 are given respective identical reference numerals, and descriptions of those members are omitted here.

<Configuration of Light Emitting Apparatus 11>

FIGS. 9(a)-9(b) are explanatory drawings schematically illustrating a configuration of a light emitting apparatus 11 including a light guide plate 120 of Embodiment 2. FIG. 9(a) is a top view of the light emitting apparatus 11, and FIG. 9(b) is a perspective view of the light emitting apparatus 11. The light emitting apparatus 11 of Embodiment 2 differs from the light emitting apparatus 1 of Embodiment 1 (described earlier) mainly in that the light emitting apparatus 11 carries out a gradation display which gradually changes a color of a light emitting region A of the light guide plate 120 from a color of light L1 to a color of light L2.

The light emitting apparatus 11 includes a light source 10 and the light guide plate 120 (see FIGS. 9(a)-9(b)).

(Light Guide Plate 120)

The light guide plate 120 is a light guide member which (i) guides light L1 and light L2 having entered the light guide plate 120 from respective light sources 10a and 10b and (ii) causes the light L1 and the light L2 to exit from the light emitting region A defined in a front surface 20b of the light guide plate 120.

In the light guide plate 120 of Embodiment 2, reflection patterns 21a are arranged so that a reflection amount of the light L1 in a first pattern region a1 gradually decreases toward a mixed-color region a3 (as closer to the mixed-color region a3), and the reflection amount is minimized in the mixed-color region a3. Further, in the light guide plate 120, reflection patterns 21b are arranged so that a reflection amount of the light L2 in a second pattern region a2 gradually decreases toward the mixed-color region a3 (as closer to the mixed-color region a3), and the reflection amount is minimized in the mixed-color region a3. This allows the light emitting apparatus 11 to carry out the gradation display in the light emitting region A.

Figure 10:
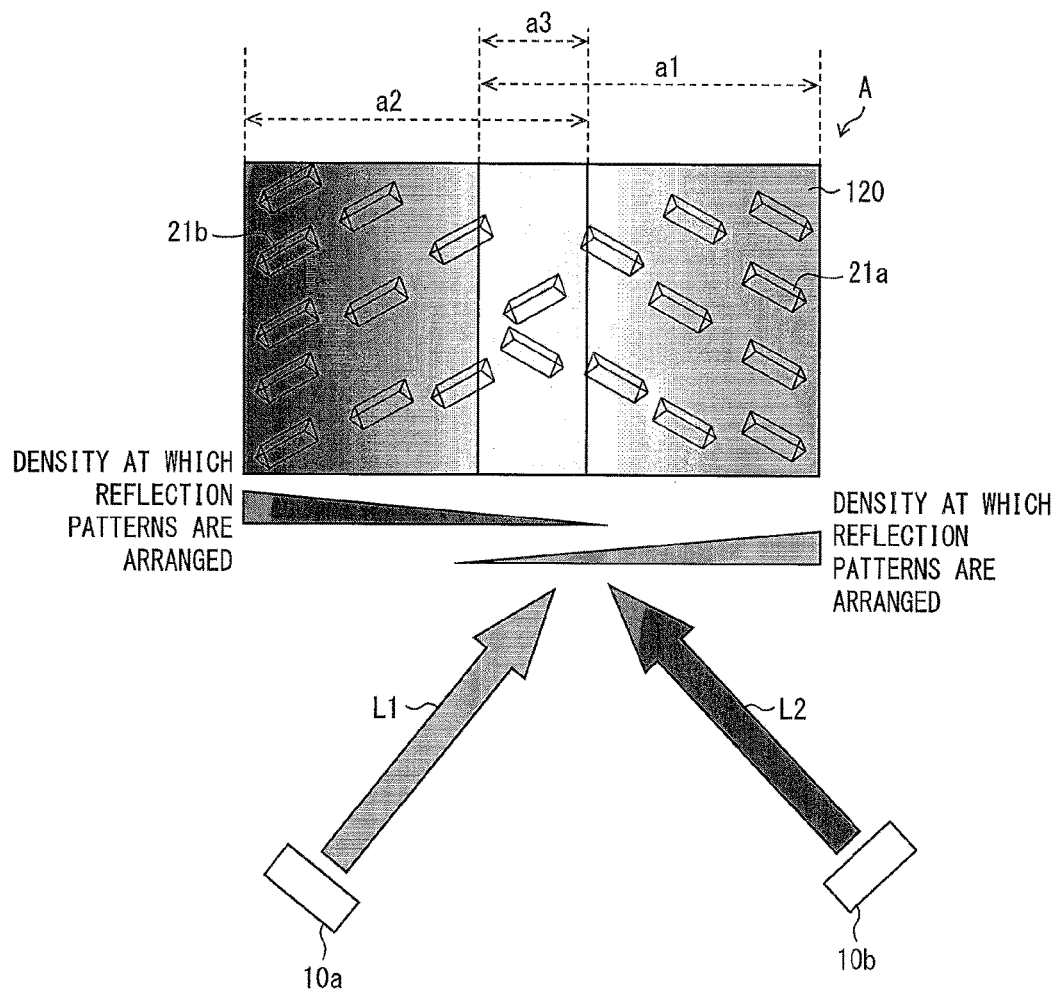
FIG. 10 is a top view illustrating an enlarged part of a light emitting region illustrated in FIGS. 9(a)-9(b).

FIG. 10 is a top view illustrating the light emitting region A illustrated in FIGS. 9(a)-9(b). As illustrated in FIG. 10, the reflection patterns 21a and the reflection patterns 21b are arranged in the light guide plate 120 so that (i) a density at which the reflection patterns 21a are arranged in the first pattern region a1 and (ii) a density at which the reflection patterns 21b are arranged in the second pattern region a2 gradually decrease toward the mixed-color region a3.

As the density at which the reflection patterns 21a are arranged gradually decreases toward the mixed-color region a3, the reflection amount of the light L1 in the first pattern region a1 gradually decreases toward the mixed-color region a3, and is minimized in the mixed-color region a3. Similarly, as the density at which the reflection patterns 21b are arranged gradually decreases toward the mixed-color region a3, the reflection amount of the light L2 in the second pattern region a2 gradually decreases toward the mixed-color region a3, and is minimized in the mixed-color region a3.

Therefore, according to the above configuration, by gradually changing a density at which first reflection patterns are arranged and a density at which second reflection patterns are arranged, it is possible to carry out the gradation display which gradually changes the color of the light emitting region A from the color of the light L1 to the color of the light L2.

<Example of how Reflection Patterns 21 are Arranged>

Figure 11:
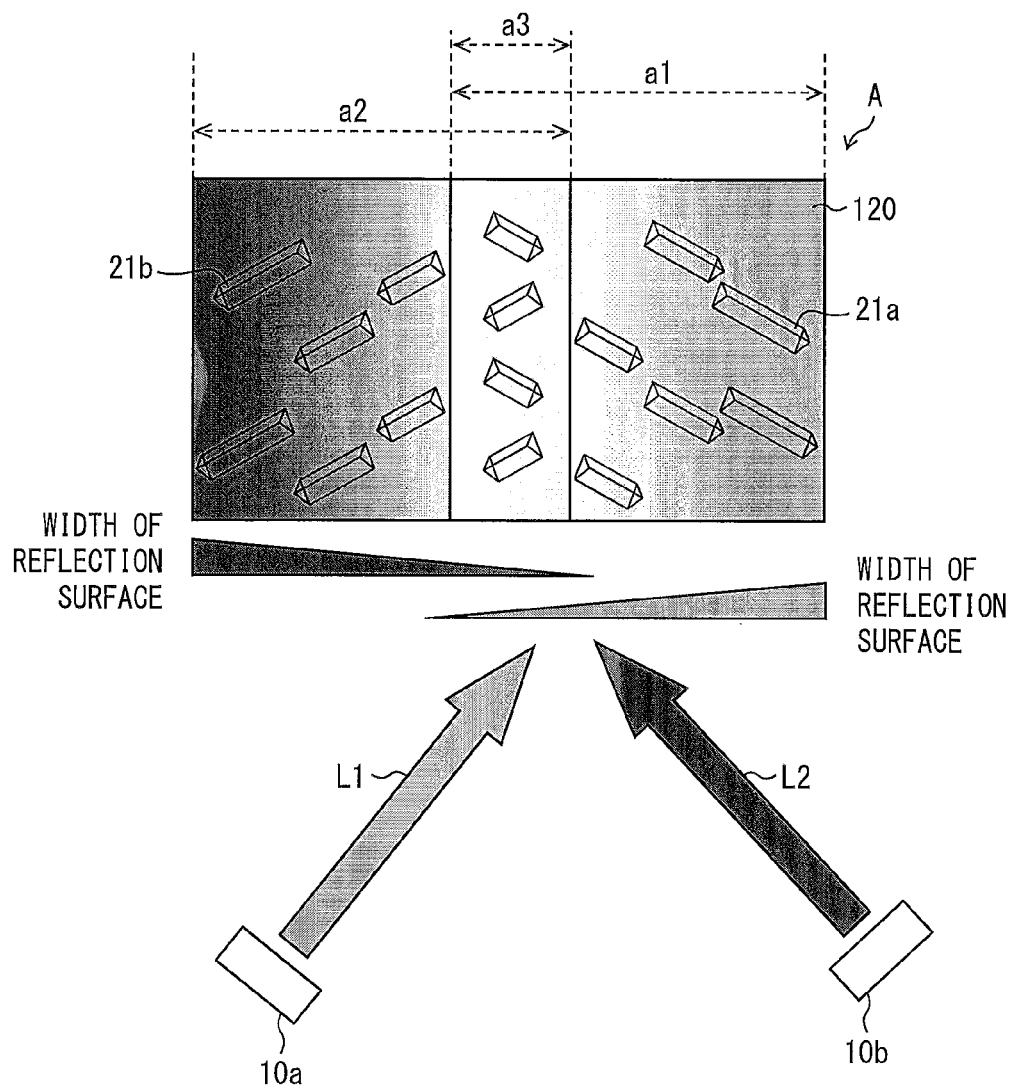
FIG. 11 is a top view illustrating another example of how reflection patterns illustrated in FIG. 10 are arranged.
Figure 12:
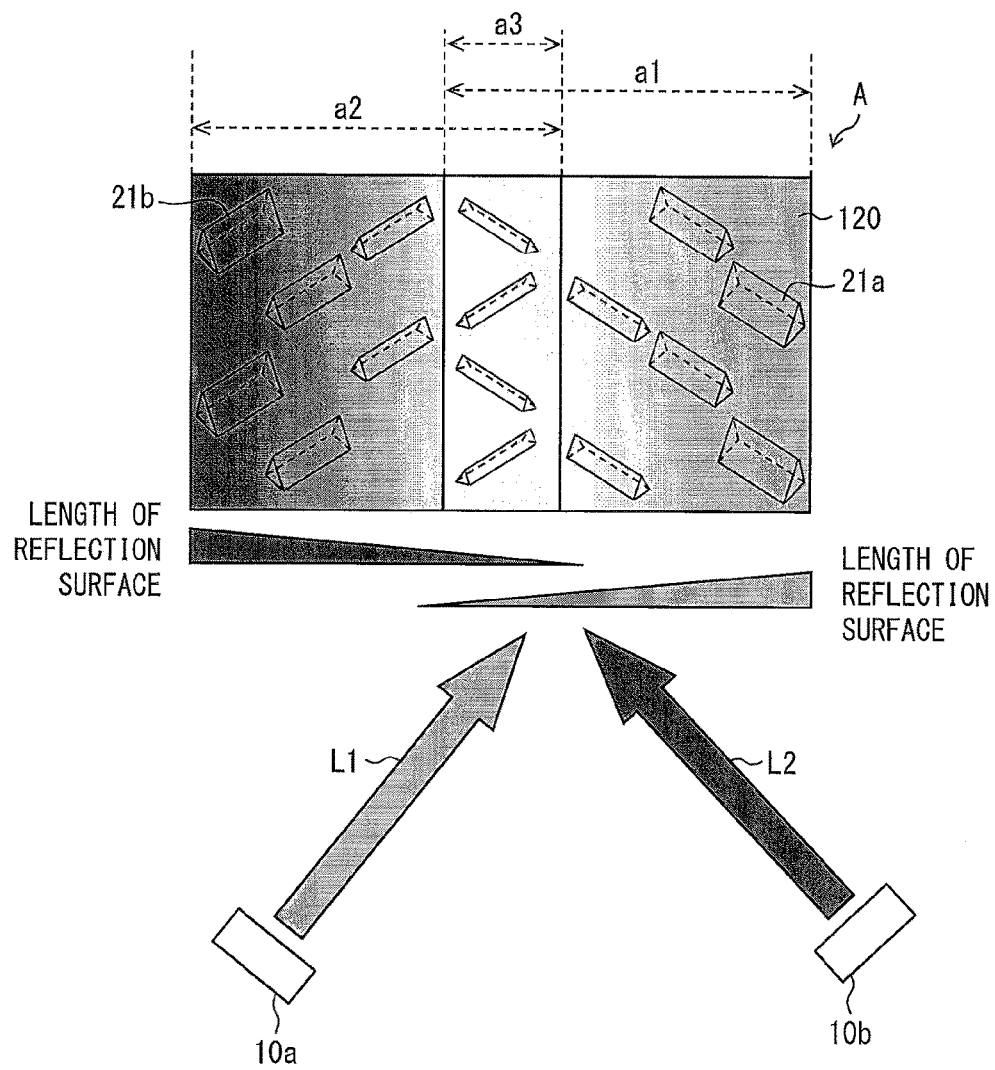
FIG. 12 is a top view illustrating yet another example of how the reflection patterns illustrated in FIG. 10 are arranged.

FIG. 11 is a top view illustrating another example of how the reflection patterns 21a and the reflection patterns 21b, illustrated in FIG. 10, are arranged. FIG. 12 is a top view illustrating yet another example of how the reflection patterns 21a and the reflection patterns 21b, illustrated in FIG. 10, are arranged.

Instead of gradually decreasing the density at which the reflection patterns 21a are arranged and the density at which the reflection patterns 21b are arranged, (i) surface areas of reflection surfaces of the respective reflection patterns 21a arranged in the first pattern region a1 and (ii) surface areas of reflection surfaces of the respective reflection patterns 21b arranged in the second pattern region a2 may be gradually decreased toward the mixed-color region a3.

By gradually decreasing, toward the mixed-color region a3, the surface areas of the reflection surfaces of the respective reflection patterns 21a, it is possible to gradually decrease, toward the mixed-color region a3, the reflection amount of the light L1 in the first pattern region a1. Similarly, by gradually decreasing, toward the mixed-color region a3, the surface areas of the reflection surfaces of the respective reflection patterns 21b arranged in the second pattern region a2, it is possible to gradually decrease, toward the mixed-color region a3, the reflection amount of the light L2 in the second pattern region a2.

As such, by gradually decreasing (i) the surface areas of the reflection surfaces of the respective reflection patterns 21a and (ii) the surface areas of the reflection surfaces of the respective reflection patterns 21b, it is possible to carry out the gradation display which gradually changes the color of the light emitting region A from the color of the light L1 to the color of the light L2.

The surface areas of the reflection surfaces of the reflection patterns 21a and 21b may be gradually decreased by gradually decreasing, toward the mixed-color region a3, (i) widths, in an in-plane direction of the front surface 20b of the light guide plate 120, of the respective reflection patterns 21a (a length of a line on which a reflection surface of a reflection pattern 21a intersects with a back surface of the light guide plate 120) and (ii) widths, in the in-plane direction, of the respective reflection patterns 21b (a length of a line on which a reflection surface of a reflection pattern 21b intersects with the back surface) (see FIG. 11).

By gradually decreasing the widths of the reflection surfaces of the respective reflection patterns 21a toward the mixed-color region a3, it is possible to gradually decrease, toward the mixed-color region a3, the reflection amount of the light L1 in the first pattern region a1. Similarly, by gradually decreasing the widths of the reflection surfaces of the respective reflection patterns 21b toward the mixed-color region a3, it is possible to gradually decrease, toward the mixed-color region a3, the reflection amount of the light L2 in the second pattern region a2.

Alternatively, as illustrated in FIG. 12, (i) lengths, in an inclination direction in which the reflection surfaces of the reflection patterns 21a are inclined, of the reflection surfaces of the respective reflection patterns 21a and (ii) lengths, in an inclination direction in which the reflection surfaces of the reflection patterns 21b are inclined, of the reflection surfaces of the respective reflection patterns 21b may be gradually decreased toward the mixed-color region a3.

By gradually decreasing the lengths, in the inclination direction, of the reflection surfaces of the respective reflection patterns 21a toward the mixed-color region a3, it is possible to gradually decrease, toward the mixed-color region a3, the reflection amount of the light L1 in the first pattern region a1. Similarly, by gradually decreasing the lengths, in the inclination direction, of the reflection surfaces of the respective reflection patterns 21b toward the mixed-color region a3, it is possible to gradually decrease, toward the mixed-color region a3, the reflection amount of the light L2 in the second pattern region a2.

As such, by gradually changing (i) the widths or the lengths, in the inclination direction, of the reflection surfaces of the respective reflection patterns 21a and (ii) the widths or the lengths, in the inclination direction, of the reflection surfaces of the respective reflection patterns 21b, it is possible to carry out the gradation display which gradually changes the color of the light emitting region A from the color of the light L1 to the color of the light L2.

<Effect of Light Emitting Apparatus 11>

As such, the light emitting apparatus 11 of Embodiment 2 includes the light guide plate 120. The reflection patterns 21a and the reflection patterns 21b are arranged in the light guide plate 120 so that the reflection amount of the light L1 in the first pattern region a1 and the reflection amount of the light L2 in the second pattern region a2 gradually decrease toward the mixed-color region a3, and are minimized in the mixed-color region a3.

Therefore, according to Embodiment 2, it is possible to realize a light emitting apparatus 11 capable of carrying out a gradation display which gradually changes, from a color of light L1 to a color of light L2, a color of part of a light emitting region A which part corresponds to a first pattern region a1 and a second pattern region a2.

Note that Embodiments 1 and 2 have described a configuration where two pattern regions (first pattern region a1 and second pattern region a2) overlap with each other. The present invention, however, is not limited to this configuration. For example, three or more pattern regions which reflect respective beams of light different in color from one another may overlap with one another. This makes it possible to generate light having a mixed color of three or more kinds of color. It is therefore possible to emit light having a desired color from the light emitting region A.

The present invention is not limited to the description of the embodiments above, but may be altered by a skilled person within the scope of the claims. That is, an embodiment based on a proper combination of technical means altered within the scope of the claims is encompassed in the technical scope of the present invention.

A light guide body according to one or more embodiments of the present invention is configured to be a light guide body which (i) guides light having entered the light guide body from a light source and (ii) causes the light to exit from a light emitting region defined in a light exit surface of the light guide body, the light guide body receiving at least first light and second light which are different in color from each other, the light guide body having a reflection region which reflects, toward the light emitting region, the first light and the second light which have entered the light guide body, the reflection region including (i) a first pattern region where a plurality of first reflection patterns which reflect the first light are arranged and (ii) a second pattern region where a plurality of second reflection patterns which reflect the second light are arranged, and when viewed from a direction perpendicular to the light exit surface, the first pattern region and the second pattern region at least partially overlapping with each other.

According to the configuration, (i) the first pattern region where the plurality of first reflection patterns which reflect the first light are arranged and (ii) the second pattern region where the plurality of second reflection patterns which reflect the second light different in color from the first light are arranged at least partially overlap with each other.

In a region (hereinafter referred to as a mixed-color region) where the first pattern region and the second pattern region overlap with each other, the first light and the second light are reflected toward the light emitting region. This allows part of the light emitting region which part corresponds to the mixed-color region to emit light having a mixed color of the color of the first light and the color of the second light.

Therefore, according to the configuration, it is possible to realize a light guide body capable of, without using a mixed-color member, causing a light emitting region to emit light having a mixed color.

The light guide body according to one or more embodiments of the present invention may be configured so that, when viewed from the direction perpendicular to the light exit surface, part of the first pattern region and part of the second pattern region overlap with each other.

According to the configuration, the part of the first pattern region and the part of the second pattern region overlap with each other. It is therefore possible to (i) emit the first light from part of the light emitting region which part corresponds only to the first pattern region, (ii) emit, from the part of the light emitting region which part corresponds to the mixed-color region, the light having the mixed color of the color of the first light and the color of the second light, and (iii) emit the second light from part of the light emitting region which part corresponds only to the second pattern region.

As such, according to configuration, it is possible to emit, from the light emitting region, light having a plurality of colors including the mixed color.

The light guide body according to one or more embodiments of the present invention may be configured so that a reflection amount of the first light reflected by the plurality of first reflection patterns gradually decreases toward a region where the first pattern region and the second pattern region overlap with each other, and a reflection amount of the second light reflected by the plurality of second reflection patterns gradually decreases toward the region where the first pattern region and the second pattern region overlap with each other.

According to the configuration, the reflection amount of the first light in the first pattern region and the reflection amount of the second light in the second pattern region gradually decrease toward the mixed-color region, and are minimized in the mixed-color region.

Therefore, according to the configuration, it is possible to carry out a gradation display which gradually changes, from the color of the first light to the color of the second light, a color of part of the light emitting region which part corresponds to the first pattern region and the second pattern region.

The light guide body according to one or more embodiments of the present invention may be configured so that (i) a density at which the plurality of first reflection patterns are arranged and (ii) a density at which the plurality of second reflection patterns are arranged gradually decrease toward the region where the first pattern region and the second pattern region overlap with each other.

According to the configuration, the density at which the plurality of first reflection patterns are arranged in the first pattern region is gradually decreased toward the mixed-color region. Therefore, the reflection amount of the first light in the first pattern region gradually decreases toward the mixed-color region, and is minimized in the mixed-color region.

Similarly, according to the configuration, the density at which the plurality of second reflection patterns are arranged in the second pattern region is gradually decreased toward the mixed-color region. Therefore, the reflection amount of the second light in the second pattern region gradually decreases toward the mixed-color region, and is minimized in the mixed-color region.

As such, according to the configuration, by gradually changing (i) the density at which the plurality of first reflection patterns are arranged and (ii) the density at which the plurality of second reflection patterns are arranged, it is possible to carry out a gradation display which gradually changes a color of the light emitting region from the color of the first light to the color of the second light.

The light guide body according to one or more embodiments of the present invention may be configured so that (i) surface areas of reflection surfaces of the respective plurality of first reflection patterns and (ii) surface areas of reflection surfaces of the respective plurality of second reflection patterns gradually decrease toward the region where the first pattern region and the second pattern region overlap with each other.

According to the configuration, the surface areas of the reflection surfaces of the respective plurality of first reflection patterns arranged in the first pattern region gradually decrease toward the mixed-color region. Therefore, the reflection amount of the first light in the first pattern region gradually decreases toward the mixed-color region, and is minimized in the mixed-color region.

Similarly, according to the configuration, the surface areas of the reflection surfaces of the respective plurality of second reflection patterns arranged in the second pattern region gradually decrease toward the mixed-color region. Therefore, the reflection amount of the second light in the second pattern region gradually decreases toward the mixed-color region, and is minimized in the mixed-color region.

As such, according to the configuration, by gradually changing (i) the surface areas of the reflection surfaces of the respective plurality of first reflection patterns and (ii) the surface areas of the reflection surfaces of the respective plurality of second reflection patterns, it is possible to carry out the gradation display which gradually changes the color of the light emitting region from the color of the first light to the color of the second light.

The light guide body according to one or more embodiments of the present invention may be configured so that (i) widths, in an in-plane direction of the light exit surface, of the respective plurality of first reflection patterns and (ii) widths, in the in-plane direction, of the respective plurality of second reflection patterns gradually decrease toward the region where the first pattern region and the second pattern region overlap with each other.

According to the configuration, the widths of the reflection surfaces of the respective plurality of first reflection patterns arranged in the first pattern region gradually decrease toward the mixed-color region. It is therefore possible to gradually decrease the surface areas of the reflection surfaces of the respective plurality of first reflection patterns toward the mixed-color region.

Similarly, according to the configuration, the widths of the reflection surfaces of the respective plurality of second reflection patterns arranged in the second pattern region gradually decrease toward the mixed-color region. It is therefore possible to gradually decrease the surface areas of the reflection surfaces of the respective plurality of second reflection patterns toward the mixed-color region.

As such, according to the configuration, by gradually changing the widths of the reflection surfaces, it is possible to carry out the gradation display which gradually changes the color of the light emitting region from the color of the first light to the color of the second light.

The light guide body according to one or more embodiments of the present invention may be configured so that (i) lengths, in an inclination direction in which the reflection surfaces of the plurality of first reflection patterns are inclined, of the reflection surfaces of the respective plurality of first reflection patterns and (ii) lengths, in an inclination direction in which the reflection surfaces of the plurality of second reflection patterns are inclined, of the reflection surfaces of the respective plurality of second reflection patterns gradually decrease toward the region where the first pattern region and the second pattern region overlap with each other.

According to the configuration, the lengths, in the inclination direction, of the reflection surfaces of the respective plurality of first reflection patterns arranged in the first pattern region gradually decrease toward the mixed-color region. It is therefore possible to gradually decrease the surface areas of the reflection surfaces of the respective plurality of first reflection patterns toward the mixed-color region.

Similarly, according to the configuration, the lengths, in the inclination direction, of the reflection surfaces of the respective plurality of second reflection patterns arranged in the second pattern region gradually decrease toward the mixed-color region. It is therefore possible to gradually decrease the surface areas of the reflection surfaces of the respective plurality of second reflection patterns toward the mixed-color region.

As such, according to the configuration, by gradually changing the lengths, in the inclination direction, of the reflection surfaces, it is possible to carry out the gradation display which gradually changes the color of the light emitting region from the color of the first light to the color of the second light.

The light guide body according to one or more embodiments of the present invention may be configured so that, when viewed from the direction perpendicular to the light exit surface, facing directions of the reflection surfaces of the respective plurality of first reflection patterns are different from those of the reflection surfaces of the respective plurality of second reflection patterns.

According to the configuration, for example, in a case where (i) the plurality of first reflection patterns are arranged so that their reflection surfaces face a first direction in which the first light enters and (ii) the plurality of second reflection patterns are arranged so that their reflection surfaces face a second direction in which the second light enters, the first direction being different from the second direction, the plurality of first reflection patterns and the plurality of second reflection patterns thus arranged can suitably reflect the first light and the second light to the light emitting region, respectively.

The light guide body according to one or more embodiments of the present invention may be configured so that the first light and the second light are caused to exit from the light emitting region in a same direction.

According to the configuration, an observer who observes the light emitting region from a direction in which the first light and the second light are caused to exit can visually recognize, in a suitable manner, the light having the mixed color of the color of the first light and the color of the second light.

The light guide body according to one or more embodiments of the present invention may be configured so that the plurality of first reflection patterns further reflect, in a direction different from that in which the first light is reflected, third light having entered the light guide body from a direction different from that in which the first light enters the light guide body, the plurality of second reflection patterns further reflect, in a direction different from that in which the second light is reflected, fourth light having entered the light guide body from a direction different from that in which the second light enters the light guide body, and the third light and the fourth light are caused to exit from the light emitting region in a same direction.

According to the configuration, the third light and the fourth light are caused to exit in a direction different from that in which the first light and the second light are caused to exit. Therefore, in a case where an observer observes the light emitting region from the direction in which the first light and the second light are caused to exit, the observer can visually recognize the light emitting region emitting the light having the mixed color of the color of the first light and the color of the second light. Further, in a case where an observer observes the light emitting region from the direction in which the third light and the fourth light are caused to exit, the observer can visually recognize the light emitting region emitting light having a mixed color of a color of the third light and a color of the fourth light.

As such, according to the configuration, it is possible to change, in accordance with an observation location of an observer, the color of the light emitting region which is visually recognized by the observer.

A light emitting apparatus according to one or more embodiments of the present invention is configured to be a light emitting apparatus, including: a first light source which emits the first light; a second light source which emits the second light; and the light guide body which (i) guides the first light and the second light having entered the light guide body from the respective first and second light sources and (ii) causes the first light and the second light to exit from the light exit surface.

According to the configuration, it is possible to realize a light emitting apparatus capable of, without using a mixed-color member, emitting light having a mixed color from a light emitting region.

An amusement machine according to one or more embodiments of the present invention is configured to include the light emitting apparatus.

According to the configuration, it is possible to realize an amusement machine capable of, without using a mixed-color member, emitting light having a mixed color from a light emitting region.

One or more embodiments of the present invention is applicable to (i) a light guide body which guides light having entered the light guide body from a light source and causes the light to exit from a light exit surface of the light guide body, and (ii) a light emitting apparatus including the light guide body. The light emitting apparatus can be suitably provided in an amusement machine such as a pachinko machine or a slot machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1, 11: Light emitting apparatus
10: Light source
10a: Light source (first light source)
10b: Light source (second light source)
20, 120: Light guide plate (light guide body)
20a: Side surface
20b: Front surface (light exit surface)
20c: Back surface
21: Reflection pattern 21a: Reflection pattern (first reflection pattern)
21b: Reflection pattern (second reflection pattern)
A: Light emitting region
a: Reflection region
a1: First pattern region
a2: Second pattern region
a3: Mixed-color region
L1: Light (first light)
L2: Light (second light)
L3: Light (third light)
L4: Light (fourth light)

The invention claimed is:

1. A light guide body configured to guide at least first and second light having different colors that enter the light guide body from at least one light source, comprising:
a light exit surface comprising a light emitting region that emits the first light and the second light from the at least one light source; and
a reflection region that reflects, toward the light emitting region, the first light and the second light that enters the light guide body,
wherein the reflection region comprises:
a first pattern region where a plurality of first reflection patterns that reflects the first light are arranged, and
a second pattern region where a plurality of second reflection patterns that reflects the second light are arranged,
wherein, when viewed from a direction perpendicular to the light exit surface, the first pattern region and the second pattern region at least partially overlapping with each other, and
wherein the light emitting region forms a shape of an object displayed on a surface of the light guide body,
wherein the object is displayed by at least light having a color obtained by mixing the first light and the second light, by causing a portion of the light emitting region to emit the light having the color obtained by mixing the first light and the second light, and
wherein the portion of the light emitting region corresponds to a region where the first pattern region and the second pattern region overlap with each other; wherein a reflection amount of the first light reflected by the plurality of the first reflection patterns gradually decreases toward a region where the first pattern region and the second pattern region overlap with each other, and
wherein a reflection amount of the second light reflected by the plurality of second reflection patterns gradually decreases toward the region where the first pattern region and the second pattern region overlap with each other.

2. The light guide body as set forth in claim 1, wherein, when viewed from the direction perpendicular to the light exit surface, only a part of the first pattern region and only a part of the second pattern region overlap with each other.

3. The light guide body as set forth in claim 1, wherein a density at which the plurality of first reflection patterns are arranged and a density at which the plurality of second reflection patterns are arranged gradually decrease toward the region where the first pattern region and the second pattern region overlap with each other.

4. The light guide body as set forth in claim 1, wherein surface areas of reflection surfaces of the respective plurality of first reflection patterns and surface areas of reflection surfaces of the respective plurality of second reflection patterns gradually decrease toward the region where the first pattern region and the second pattern region overlap with each other.

5. The light guide body as set forth in claim 4, wherein widths, in an in-plane direction of the light exit surface, of the respective plurality of first reflection patterns and widths, in the in-plane direction, of the respective plurality of second reflection patterns gradually decrease toward the region where the first pattern region and the second pattern region overlap with each other.

6. The light guide body as set forth in claim 4, wherein lengths, in an inclination direction in which the reflection surfaces of the plurality of first reflection patterns are inclined, of the reflection surfaces of the respective plurality of first reflection patterns and lengths, in an inclination direction in which the reflection surfaces of the plurality of second reflection patterns are inclined, of the reflection surfaces of the respective plurality of second reflection patterns gradually decrease toward the region where the first pattern region and the second pattern region overlap with each other.

7. The light guide body as set forth in claim 1, wherein, when viewed from the direction perpendicular to the light exit surface, facing directions of the reflection surfaces of the respective plurality of first reflection patterns are different from those of the reflection surfaces of the respective plurality of second reflection patterns.

8. The light guide body as set forth in claim 1, wherein the first light and the second light are caused to exit from the light emitting region in a same direction.

9. The light guide body as set forth in claim 8,
wherein the plurality of first reflection patterns further reflect, in a direction different from that in which the first light is reflected, third light having entered the light guide body from a direction different from that in which the first light enters the light guide body,
wherein the plurality of second reflection patterns further reflect, in a direction different from that in which the second light is reflected, fourth light having entered the light guide body from a direction different from that in which the second light enters the light guide body, and
wherein light guide body is structured to emit the third light and the fourth light from the light emitting region in a same direction.

10. A light emitting apparatus, comprising:
a first light source that emits first light;
a second light source that emits second light that is different in color from the first light; and
a light guide body that guides the first light and the second light that enter the light guide body from the first light source and the second light source,
wherein the light guide body comprises:
a light exit surface comprising a light emitting region that emits the first light and the second light from the first light source and the second light source, and
a reflection region that reflects, toward the light emitting region, the first light and the second light that enters the light guide body,
wherein the reflection region comprises:
a first pattern region where a plurality of first reflection patterns that reflects the first light are arranged, and
a second pattern region where a plurality of second reflection patterns that reflects the second light are arranged, wherein, when viewed from a direction perpendicular to the light exit surface, the first pattern region and the second pattern region at least partially overlapping with each other, and wherein the light emitting region forms a shape of an object displayed on a surface of the light guide body, wherein the object is displayed by at least light having a color obtained by mixing the first light and the second light, by causing a portion of the light emitting region to emit the light having the color obtained by mixing the first light and the second light, and wherein the portion of the light emitting region corresponds to a region where the first pattern region and the second pattern region overlap with each other; wherein a reflection amount of the first light reflected by the plurality of the first reflection patterns gradually decreases toward a region where the first pattern region and the second pattern region overlap with each other, and wherein a reflection amount of the second light reflected by the plurality of second reflection patterns gradually decreases toward the region where the first pattern region and the second pattern region overlap with each other.

11. An amusement machine, comprising:
a light emitting apparatus, comprising:
   a first light source that emits first light;
   a second light source that emits second light that is different in color from the first light; and
   a light guide body that guides the first light and the second light that enter the light guide body from the first light source and the second light source,
   wherein the light guide body comprises:
      a light exit surface comprising a light emitting region that emits the first light and the second light from the first light source and the second light source, and
      a reflection region that reflects, toward the light emitting region, the first light and the second light that enters the light guide body,
   wherein the reflection region comprises:
      a first pattern region where a plurality of first reflection patterns that reflects the first light are arranged, and
      a second pattern region where a plurality of second reflection patterns that reflects the second light are arranged,
   wherein, when viewed from a direction perpendicular to the light exit surface, the first pattern region and the second pattern region at least partially overlapping with each other, an4
   wherein the light emitting region forms a shape of an object displayed on a surface of the light guide body,
   wherein the object is displayed by at least light having a color obtained by mixing the first light and the second light, by causing a portion of the light emitting region to emit the light having the color obtained by mixing the first light and the second light, and
   wherein the portion of the light emitting region corresponds to a region where the first pattern region and the second pattern region overlap with each other; wherein a reflection amount of the first light reflected by the plurality of first reflection patterns gradually decreases toward a region where the first pattern region and the second pattern region overlap with each other, and
   wherein a reflection amount of the second light reflected by the plurality of second reflection patterns gradually decreases toward the region where the first pattern region and the second pattern region overlap with each other.

* * * * *

UNITED STATES PATENT AND TRADEMARK OFFICE
CERTIFICATE OF CORRECTION

PATENT NO. : 9,869,812 B2
APPLICATION NO. : 14/553836
DATED : January 16, 2018
INVENTOR(S) : Yoshihiko Takagi et al.

It is certified that error appears in the above-identified patent and that said Letters Patent is hereby corrected as shown below:

In the Claims

At Column 18, Claim number 11, Line number 14, the word "an4" should read --and--.

Signed and Sealed this
Fifth Day of June, 2018

Andrei Iancu
*Director of the United States Patent and Trademark Office*